United States Patent Office 2,852,345
Patented Sept. 16, 1958

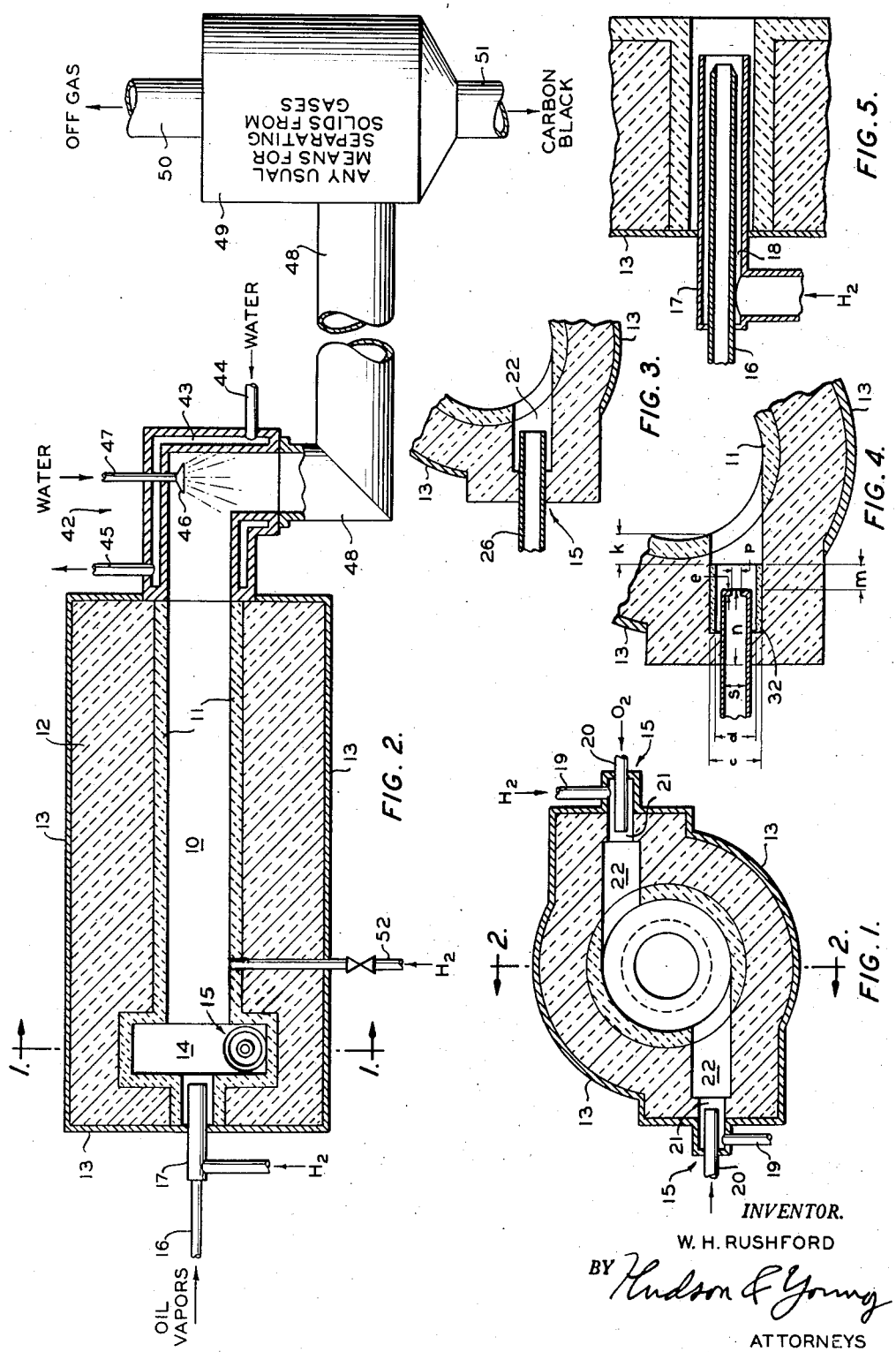

2,852,345

PROCESS FOR PRODUCTION OF CARBON BLACK

Wilson H. Rushford, London, England, assignor to Phillips Petroleum Company, Bartlesville, Okla., a corporation of Delaware Application January 20, 1956, Serial No. 560,454

5 Claims. (Cl. 23—209.4)

This invention relates to a process of making carbon black by the pyrolytic conversion of a hydrocarbon stream in a furnace in the presence of a hot gas, or flame injected into said furnace, or produced therein from injected free oxygen containing gas undergoing partial or complete combustion in said furnace hot reaction zone to pyrolytically crack and convert a portion of said hydrocarbon stream to carbon black. In one aspect it relates to increasing the amount of carbon black formed in said hot reaction zone by changing the equilibrium of mass reaction of all the numerous reactions occurring in such a process to favor the formation of carbon by adding additional hydrogen to the gases present. In another aspect it relates to inhibiting or reducing the deposit of formations of carbonaceous material around the inlet of said hydrocarbon stream and/or said free oxygen containing gas inlet by injecting adjacent said inlet, preferably as an annulus around the same, a stream of gaseous hydrogen.

It is old in the prior art to attempt to prevent such deposit of carbonaceous material around such inlets by injecting free oxygen containing gas, but this has been found to have disadvantages, in that combustion took place converting some of the more valuable hydrocarbon stream into carbon dioxide and carbon monoxide from which it is very difficult to recover the carbon as carbon black in such a furnace, and this combustion tended to cause local overheating and burning up or melting and blowing away molten droplets of metal pipes commonly employed in such inlets, or similar spalling of ceramic inlet pipes, with resultant metal or grit contamination of the carbon black. It will be obvious this action results in both a reduction in the amount and quality of the carbon black produced and depresses the amount of money received for the same even greater than would be expected by the hydrocarbon, metal and ceramic lost in the process.

I have discovered that the deposit of carbonaceous material can be reduced, the destruction of furnace parts reduced, the temperature of parts reduced, and the amount and quality of carbon black produced increased, by injecting adjacent such inlets for hydrocarbon streams and/or free-oxygen containing gas inlets, preferably as an annulus around the same, a stream of gaseous hydrogen.

One object of the present invention is to provide an improved process of making furnace carbon black.

Another object is to increase the amount of carbon black formed in the carbon black furnace reaction zone by shifting the equilibrium therein in favor of carbon black formation by the addition of hydrogen.

Another object is to inhibit the formation of carbonaceous deposits on the walls of the carbon black furnace, especially adjacent the inlets.

Another object is to reduce oxidation, overheating, and errosion of furnace parts, especially inlets, and to increase the quality of the carbon black produced by reducing the products of their destruction in the effluent smoke from the furnace.

Numerous other objects and advantages will be apparent to those skilled in the art upon reading the accompanying specification, claims and drawing.

The accompanying diagrammatic drawing is a part of this specification and illustrates a preferred form of the apparatus in which to practice the process of my invention.

Figure 1 is a transverse sectional view of a furnace embodying my invention and taken on the line 1—1 of Figure 2.

Figure 2 is a longitudinal sectional view of the same furnace taken on the line 2—2 of Figure 1.

Figure 3 is a transverse sectional view of a modified furnace embodying my invention having a second form of tangential fuel injection assembly.

Figure 4 is a view similar to Figure 3 showing a third form of the tangential fuel injection assembly.

Figure 5 is an enlarged view of a portion of Figure 2 showing the reaction hydrocarbon inlet tube 16 and related parts in greater detail.

Like numerals on the figures refer to like parts. The drawing is herein presented in diagrammatic form only, and such member parts as feed lines, air carrying pipes, combustible gas pipes, pumps, valves, meters, pressure regulators, pressure measuring devices, temperature measuring devices, and other conventional apparatus are not shown for purposes of simplicity. The quenching and cooling means, and the carbon black separating means may be as described in some more detail, yet more or less broadly, in U. S. Patents 2,375,796, 2,375,797 and 2,375,798, patented May 15, 1945.

While I have shown my invention as applied to a furnace of the type shown in Krejci 2,564,700 August 21, 1951, it will be apparent that it is equally applicable to any known carbon black furnace for the pyrolytic conversion of hydrocarbons, such as shown by Ayres Re. 22,886, June 3, 1947; Krejci 2,375,795, May 15, 1945, and many other furnaces of quite different construction as long as the carbon black is produced by pyrolytic conversion of hydrocarbons in the presence of heated gas, or flame, in a furnace in which the heat is supplied by complete or incomplete combustion of said hydrocarbons, or fuel gas, with a free-oxygen containing gas.

Referring now to the drawing which illustrates one form of apparatus in which the process of my invention may be practiced, the cylindrical reaction chamber 10 has a lining 11 of highly refractory material such as sillimanite, alumina or other refractory suitable for the purpose at hand. Between this refractory liner 11 and a cylindrical steel shell 13 is a layer of insulation 12. At the upstream end of this chamber is a short cylindrical section 14 of rather large diameter which may be called a "combustion" zone. This section has a refractory lining 11, which is in fact a continuation of the lining 11 from the reaction zone 10. The insulation material 12 also extends around this upstream section between its liner and the steel shell 13. At the outlet end of the furnace is a cooler assembly 42, a conduit cooler 48, and a carbon black separating or recovery means 49.

In one furnace which I may use, the combustion zone 14 was 33 inches in diameter and 12 inches long, while the reaction zone 10 was 15 inches in diameter and 11 feet long. In another furnace having a 33 inch by 12 inch combustion section, the reaction zone was 12 inches in diameter by 11 feet long. These dimensions are given merely as examples, and any or all dimensions may be varied as desired.

In the upstream or inlet end wall of the combustion zone 14 of the furnace is a feed pipe 16 arranged axially so that feed introduced therethrough will pass axially through the furnace. Surrounding this feed pipe 16 (Figures 2 and 5) is a larger pipe 17. The arrangement of these two pipes 16 and 17, defines an annular space 18 through which it is intended to pass hydrogen into the furnace. Hydrogen passing through this annular space 18 is intended to keep the inner end of the feed tube cool to prevent the deposition of carbon thereon. Of course, if some carbon does deposit on the inner end of the feed tube this hydrogen will assist in its removal without combustion.

In the combustion zone 14 are arranged some inlets 15 (Figures 1 and 3) which are so disposed that gas passing therethrough and into the combustion zone will do so in a direction tangent to the cylindrical wall. Each tangential gas inlet 15 consists of a small conduit 21 (Figure 1), joining a larger conduit or tunnel 22, which latter terminates as an opening in the refractory liner 11 of the combustion chamber wall. A pipe 20 extends part way into the small conduit 21, as shown. As mentioned hereinbefore, this gas inlet assembly is so arranged that gas entering the combustion chamber therethrough does so in a direction tangent to the cylindrical wall at its point of inlet.

In a manner similar to the way pipe 17 forms a jacket around pipe 16 in Figures 1 and 5, in Figure 1 I prefer to form a similar jacket at 15 around pipe 20 and supply an annular sheath of hydrogen from said pipe 19 around the free oxygen containing gas emerging from pipe 20. Through this burner assembly is passed a combustible mixture of fuel gas, such as natural gas, and an oxygen containing gas, such as air. This combustible mixture is intended to begin burning as soon as it leaves the inner end of the conduit tubes 26. Burning gas and flame, and air, and hot products of combustion then flow circumferentially around the wall of the combustion zone 14. Upon continued injection of the combustible fuel mixture, the flame and combustion products follow a spiral path until the diameter of the spiral becomes less than the diameter of the reaction zone 10. By this time it is intended that substantially all of the gaseous fuel has been consumed, and the hot combustion products then follow a helical path adjacent the cylindrical wall through the reaction zone. In the case where there is more fuel than the stoichiometric proportion it is burned to carbon monoxide, carbon dioxide and water and the conditions of relatively low pressure and relatively high temperature in the furnace are such that the carbon in these combustion products is probably unavailable for conversion into carbon black. Passage of these combustion gases through the reaction zone is caused by the continuous addition of more fuel gas and air through the tangential burners 15 and the only opening for exit is the open downstream end of the furnace.

The tangential openings 22 are extended substantially from the shell of the furnace through the insulation and terminate in the periphery of the combustion section. The positioning of these fuel inlets is so intended that gaseous fuel passing therethrough enters the combustion zone in a direction substantially tangent to the circular walls. The fuel, also, is forced through the inlet tube 26 (Figure 3) at sufficient velocity that the fuel as it burns is maintained by centrifugal force adjacent the walls of the combustion zone. As fuel is added, the swirling flame and combustion products travel in a spiral path until the diameter of the spiral is about equal or some smaller than the diameter of the reaction zone 10, when, as mentioned hereinbefore, the rotating gases pass helically through this latter zone. In the operation of my furnace it is intended that the combustible gas be substantially completely burned by the time the gases enter the reaction zone 10 or by the time it contacts the reactant hydrocarbon added through the feed tube 16.

The effluent gases and suspended carbon black issuing from the outlet end of the reactor chamber 10 pass directly into a chiller assembly which consists of a water jacketed cooler 42 and a water sprayer 46. The inside diameter of this jacket assembly may be substantially the same as the diameter of the reactor chamber 10 so as not to interfere with the helical movement of the blanketing material between the central core products and the reactor walls 11. In this manner the metal walls of the cooler are maintained substantially free of carbon. Pipe 44 conducts cooling water from a source, not shown, to the water jacket, the water passing through the space 43 and out through the outlet pipe 45 to such disposal as desired. Pipe 47 conducts water from a source, not shown, to the spray nozzle 46. From this water cooling zone, the gases and carbon black pass through pipe 48 to a carbon black separating means 49. Pipe 48 may be a long pipe intended to serve as an auxiliary cooler as well as a conduit. When this pipe serves as a cooler, transferring heat from its interior to the atmosphere, the amount of spray water may be greatly reduced. This operation also reduces the load on the separating system 49. Gas from which carbon black has been removed issues from the separator through pipe 50 while the carbon black passes through outlet pipe 51 to such disposal or further treatment as desired.

The combustion of the tangentially injected fuel during operation begins well within the tunnel 22 and at a point rather close to the outlet end of the fuel injection pipe 26 of Figure 3, or close to the outlet end of the restricted section 21 when the tangential port assembly of Figure 1 is used. Combustion of a portion of the tangentially added fuel gas in this tunnel 22 is a preferred method of operation since a steadier flame can be maintained in this manner. However, this is not an essential part of the process since all of the combustion can be carried out inside of the 33 inch combustion chamber and before any mixing with the oil feed vapors occurs. Also in some commercial operations of the process the temperature in space 14 indicates that the combustion of fuel from pipe 20 possibly is completed by the time it emerges out of tunnel 22 into space 14.

The substantial separation of the heat furnishing combustion reactions and the carbon forming reactions in space has solved the combustion problem encountered in some conventional carbon black furnace processes at high throughputs. In my furnace the combustion was smooth in all of the runs reported herein, and no indications were apparent that combustion would not have been good at even higher oil throughputs.

Figure 4 illustrates diagrammatically an alternate form of burner assembly for use in injection of a combustible fuel-air mixture tangentially into the combustion chamber 14. When using a burner nozzle of this type the tunnel 22 extends from the combustion chamber 14 for quite some distance. If desired, the tunnel 22 may extend entirely through the furnace insulation or may terminate at about such a point as illustrated in Figure 4. The tunnel may be lined with a refractory tube 32. The dimension K in this form of burner was 14 inches, $c$ was 8 inches, $d$ was 6 inches, $p$ was 3½ inches, $e$ was ¼ inch, $m$ was 3 inches, $n$ was 4¾ inches and $s$ was 5½ inches. The burner tube may be made of an 18–8 stainless steel, 27 Cr or 25–20 stainless steel or any other metal or alloy which is suitable under the conditions encountered in such an installation. The dimensions given for the burner assembly of Figure 4 are intended to be exemplary and may be varied as desired within certain limits as will be recognized by those skilled in the art.

*Example*

In this example, the carbon black furnace is of the type shown in Figure 2 in which reactor section 11 is 1 foot in diameter and about 10 feet long, combustion chamber 14 is about 3 feet in diameter and 1 foot long, and other parts proportional as shown in the drawing, with a 1 inch open end hydrocarbon tube 16 having a ⅛ inch width annulus between it and tube 17, and tube 16 recessed ¼" inside tube 17. The hydrocarbon in pipe 16 is an oil feed of 210 gallons per hour of at least 80% vapor at 775° F. of a 21 API gravity oil, with an ASTM boiling point of 90% boiling at 775° F. and a Bureau of Mines Correlation Index of 90. The tangential gas fuel fed through pipes 20 is 95% or more methane, the remainder being mainly ethane, propane, butane and/or pentane, and the feed rate of this gas is 9,330 standard cubic feet per hour. The air mixed with the gas in pipes 20 is fed at 140,000 standard cubic feet per hour. The annulus gas feed between pipes 16 and 17 is 4,000 standard cubic feet per hour. When hydrogen is substituted for air as this annulus gas, 0.1 pound more of carbon black is produced per gallon of oil entering through pipe 16. The tubes 16 and 17 are noticeably cooler and their life is substantially extended. The oil fed into the furnace through pipe 16 in the example is first heated to 775° F. so that it is at least 80% vapor, but it can be added as a cooler liquid spray. In this example, when air is employed in the annulus, the amount of air added tangentially is reduced a corresponding equal amount from that given above. When oil 16 is sprayed in liquid form through a spray nozzle (as in Figure 4) the use of hydrogen as annulus gas substantially reduces choking of the nozzle due to the nozzle being cooler and lack of burning on the face of the nozzle as when air is used as the annulus gas.

The chief reactions believed to occur in the furnace of the many reactions that do occur, are:

(1) $\quad C_nH_{2n} \rightarrow nC + nH_2$
(2) $\quad CO + H_2 \rightarrow H_2O + C$
(3) $\quad CO_2 + 2H_2 \rightarrow 2H_2O + C$ These reactions are somewhat in equilibrium with each other, and are somewhat reversible, except that (1) is not reversible under the heat and low pressure involved, except for the formation of some minor acetylene and possible methane formation, and obviously the presence of additional amounts of hydrogen will tend to drive Equations 2 and 3 to the carbon black formation side of the equation. The presence of free oxygen in the annulus gas when that gas is air, has the opposite, and undesired effect. The above theory of reactions is not depended on to the support the invention, as no one knows exactly what occurs, but is merely put forth as a possible explanation.

While a specific example of a preferred embodiment of the invention has been given for purposes of illustration, the invention obviously is not limited thereto.

Having described my invention, I claim:

1. A process for producing carbon black having high reinforcing properties in rubber similar to those of channel black which comprises establishing in a generally cylindrical first zone having a diameter greater than its length a rotating mass of hot combustion gases by injecting tangentially thereinto previously produced hot combustion gases, continuously injecting tangentially additional hot combustion gases to said rotating mass to maintain a carbon black forming temperature in said first cylindrical zone, continuously passing a portion of said gases while so rotating into a generally cylindrical second zone the length of which is greater than its diameter and the diameter of which is less than that of said first zone, said second zone being in communication with and in axial alignment with said first zone whereby a helical movement of said gases is provided along the inner surface of said second zone, introducing a vaporized normally liquid hydrocarbon through an inlet pipe directed and disposed along the axis of said first zone, injecting a gas consisting essentially of hydrogen into said first zone in the form of a sheath surrounding said pipe and said vaporized hydrocarbons in a minor amount sufficient to prevent the deposit of carbonaceous material on said pipe, passing said vaporized hydrocarbons surrounded by said sheath of hydrogen axially through said rotating mass in said first zone and axially into the center of said helically moving gases in said second zone, forming carbon black from said vaporous hydrocarbon by pyrochemical action due to the heat of the surrounding hot combustion gases without the further addition of any substantial amount of air, and separating said carbon black from the resultant gaseous products of said process.

2. The process of claim 1 in which said tangentially injected combustion gases are formed by injecting a free oxygen containing gas through a second inlet pipe directed and disposed generally tangential to the inner wall of said first chamber, introducing a gas consisting essentially of hydrogen in the form of a second sheath surrounding said second inlet pipe and said injected free oxygen containing gas, and burning said second sheath of hydrogen with said free oxygen containing gas to provide heat for said pyrochemical action, the addition of said hydrogen shifting the equilibrium of the reactions in the zones of said furnace to decrease the amount of carbon black oxidized per unit of said normally liquid hydrocarbon.

3. A process for producing carbon black which comprises establishing in a furnace a zone of hot combustion gases formed by burning fuel gas with free oxygen containing gas, introducing through an inlet pipe into said zone a stream of normally liquid vaporized hydrocarbon, introducing around said inlet pipe and said stream of hydrocarbon a sheath of gas consisting essentially of hydrogen in an amount sufficient to prevent the deposit of carbonaceous material on said pipe forming carbon black from said vaporized hydrocarbons by pyrochemical action due to the heat of the surrounding hot combustion gases, the addition of said hydrogen shifting the equilibrium of the reactions in said furnace to decrease the amount of carbon black oxidized per unit of said normally liquid hydrocarbon, and separating the resulting carbon black from the resulting gaseous products of said process.

4. A process for producing carbon black which comprises establishing in a generally cylindrical furnace a zone of hot combustion gases formed by introducing generally tangential to the inner surface of said generally cylindrical furnace burning fuel gas with free oxygen containing gas, introducing through an inlet pipe generally axially into said generally cylindrical furnace containing said zone a stream of normally liquid vaporized hydrocarbon, introducing around said inlet pipe and said stream of hydrocarbon a sheath of gas consisting essentially of hydrogen in an amount sufficient to prevent the deposit of carbonaceous material on said pipe forming carbon black from said vaporized hydrocarbon by pyrochemical action due to the heat of the surrounding hot combustion gases, the addition of said hydrogen shifting the equilibrium of the reactions in said furnace to decrease the amount of carbon black oxidized per unit of said normally liquid hydrocarbon, and separating the resulting carbon black from the resulting gaseous products of said process.

5. A process for producing carbon black which comprises introducing a free oxygen containing gas tangentially into a generally cylindrical furnace, introducing axially through an inlet pipe into said furnace a stream of normally liquid vaporized hydrocarbon, injecting into said furnace around said pipe and said hydrocarbon a sheath of gas consisting essentially of hydrogen in an amount sufficient to prevent the deposit of carbonaceous material on said pipe, burning said hydrogen with said free oxygen, forming carbon black from said vaporized hydrocarbon by pyrochemical action due to the heat of said burning, and separating the resulting carbon black from the resulting gaseous products of said process.

References Cited in the file of this patent

UNITED STATES PATENTS

| | | |
|---|---|---|
| 2,121,463 | Wisdom | June 21, 1938 |
| 2,153,951 | Barber | Apr. 11, 1939 |
| 2,564,700 | Krejci | Aug. 21, 1951 |
| 2,694,621 | Steinschlaeger | Nov. 16, 1954 |
| 2,705,189 | Ekholm | Mar. 29, 1955 |
| 2,772,729 | Mayhew | Dec. 4, 1956 |